(12) United States Patent
Sikora

(10) Patent No.: US 11,480,355 B2
(45) Date of Patent: *Oct. 25, 2022

(54) SPACE CONDITIONING BASED ON WEATHER INFORMATION

(71) Applicant: Honeywell International Inc., Morris Plains, NJ (US)

(72) Inventor: Marek Sikora, Kurim (CZ)

(73) Assignee: Honeywell International Inc., Charlotte, NC (US)

( * ) Notice: Subject to any disclaimer, the term of this patent is extended or adjusted under 35 U.S.C. 154(b) by 229 days.

This patent is subject to a terminal disclaimer.

(21) Appl. No.: 16/895,519

(22) Filed: Jun. 8, 2020

(65) Prior Publication Data

US 2020/0300494 A1 Sep. 24, 2020

Related U.S. Application Data

(63) Continuation of application No. 15/903,692, filed on Feb. 23, 2018, now Pat. No. 10,677,488.

(51) Int. Cl.
*F24F 11/62* (2018.01)
*F24F 11/80* (2018.01)
(Continued)

(52) U.S. Cl.
CPC .............. *F24F 11/62* (2018.01); *F24F 11/46* (2018.01); *F24F 11/52* (2018.01); *F24F 11/56* (2018.01); *F24F 11/57* (2018.01); *F24F 11/58* (2018.01); *F24F 11/63* (2018.01); *F24F 11/64* (2018.01); *F24F 11/65* (2018.01); *F24F 11/80* (2018.01); *G05B 11/01* (2013.01); *G05B 17/02* (2013.01); *G05B 19/048* (2013.01); *G05B 19/0428* (2013.01); *H04L 12/282* (2013.01); *H04L 12/2803* (2013.01); *F24F 2110/10* (2018.01);
(Continued)

(58) Field of Classification Search
CPC .. F24F 11/30; F24F 11/32; F24F 11/46; F24F 11/52; F24F 11/56; F24F 11/57; F24F 11/58; F24F 11/62; F24F 11/63; F24F 11/64; F24F 11/65; F24F 2110/00; F24F 2110/10; F24F 2110/12; F24F 2130/00; F24F 2130/10; F24F 2140/60; G05B 11/01; G05B 17/02; G05B 19/0428; G05B 19/048; G05B 2219/2614; G05B 2219/2642; G05B 2219/31437; H04L 12/2803; H04L 12/282; H04L 2012/2841
See application file for complete search history.

(56) References Cited

U.S. PATENT DOCUMENTS 7,043,341 B2 5/2006 Gallupe et al.
9,595,070 B2 3/2017 Matsuoka et al.
(Continued)

*Primary Examiner* — Crystal J Barnes-Bullock
(74) *Attorney, Agent, or Firm* — Brooks, Cameron & Huebsch, PLLC

(57) ABSTRACT

Methods, devices, and systems for space conditioning based on weather information are described herein. One device includes a memory, and a processor to execute executable instructions stored in the memory to receive forecasted weather information, determine, based on the forecasted weather information, future weather conditions, determine based on the future weather conditions and historical setpoint data, whether conditioning of a space is expected, and generate an alert in response to conditioning of the space being expected.

20 Claims, 4 Drawing Sheets

(51) Int. Cl.
    *F24F 11/46* (2018.01)
    *F24F 11/64* (2018.01)
    *F24F 11/52* (2018.01)
    *F24F 11/63* (2018.01)
    *F24F 11/56* (2018.01)
    *F24F 11/57* (2018.01)
    *F24F 11/58* (2018.01)
    *F24F 11/65* (2018.01)
    *G05B 19/048* (2006.01)
    *G05B 17/02* (2006.01)
    *G05B 11/01* (2006.01)
    *G05B 19/042* (2006.01)
    *H04L 12/28* (2006.01)
    *F24F 130/10* (2018.01)
    *F24F 110/32* (2018.01)
    *F24F 110/22* (2018.01)
    *F24F 110/12* (2018.01)
    *F24F 110/10* (2018.01)
    *F24F 140/60* (2018.01)

(52) U.S. Cl.
    CPC ....... *F24F 2110/12* (2018.01); *F24F 2110/22* (2018.01); *F24F 2110/32* (2018.01); *F24F 2130/10* (2018.01); *F24F 2140/60* (2018.01); *G05B 2219/2614* (2013.01); *G05B 2219/2642* (2013.01); *G05B 2219/31437* (2013.01); *H04L 2012/2841* (2013.01); *Y02P 80/10* (2015.11)

(56) References Cited

U.S. PATENT DOCUMENTS

| | | | |
|---|---|---|---|
| 10,253,998 | B1 | 4/2019 | Goodman et al. |
| 10,344,522 | B1* | 7/2019 | Hatch ................. H04L 12/2827 |
| 10,354,345 | B2* | 7/2019 | Sloop ..................... G05B 15/02 |
| 10,371,861 | B2* | 8/2019 | Yu .......................... G06Q 50/06 |
| 10,401,811 | B2 | 9/2019 | Trundle et al. |
| 10,539,336 | B2 | 1/2020 | Hoffman |
| 10,677,488 | B2* | 6/2020 | Sikora ................. H04L 12/2803 |
| 10,718,541 | B2* | 7/2020 | Chakravarty ............ F24F 11/62 |
| 11,282,150 | B2* | 3/2022 | Matsuoka .............. G06Q 50/06 |
| 2015/0369502 | A1 | 12/2015 | Turner |
| 2016/0146497 | A1 | 5/2016 | Chapman et al. |
| 2016/0348936 | A1 | 12/2016 | Johnson, Jr. et al. |
| 2018/0058710 | A1 | 3/2018 | Lewis |
| 2018/0266718 | A1 | 9/2018 | Gillette et al. |
| 2018/0267701 | A1 | 9/2018 | Rigg et al. |
| 2019/0156649 | A1 | 5/2019 | Gokhale et al. |
| 2019/0203965 | A1* | 7/2019 | Thibault ................. F24F 11/65 |

* cited by examiner

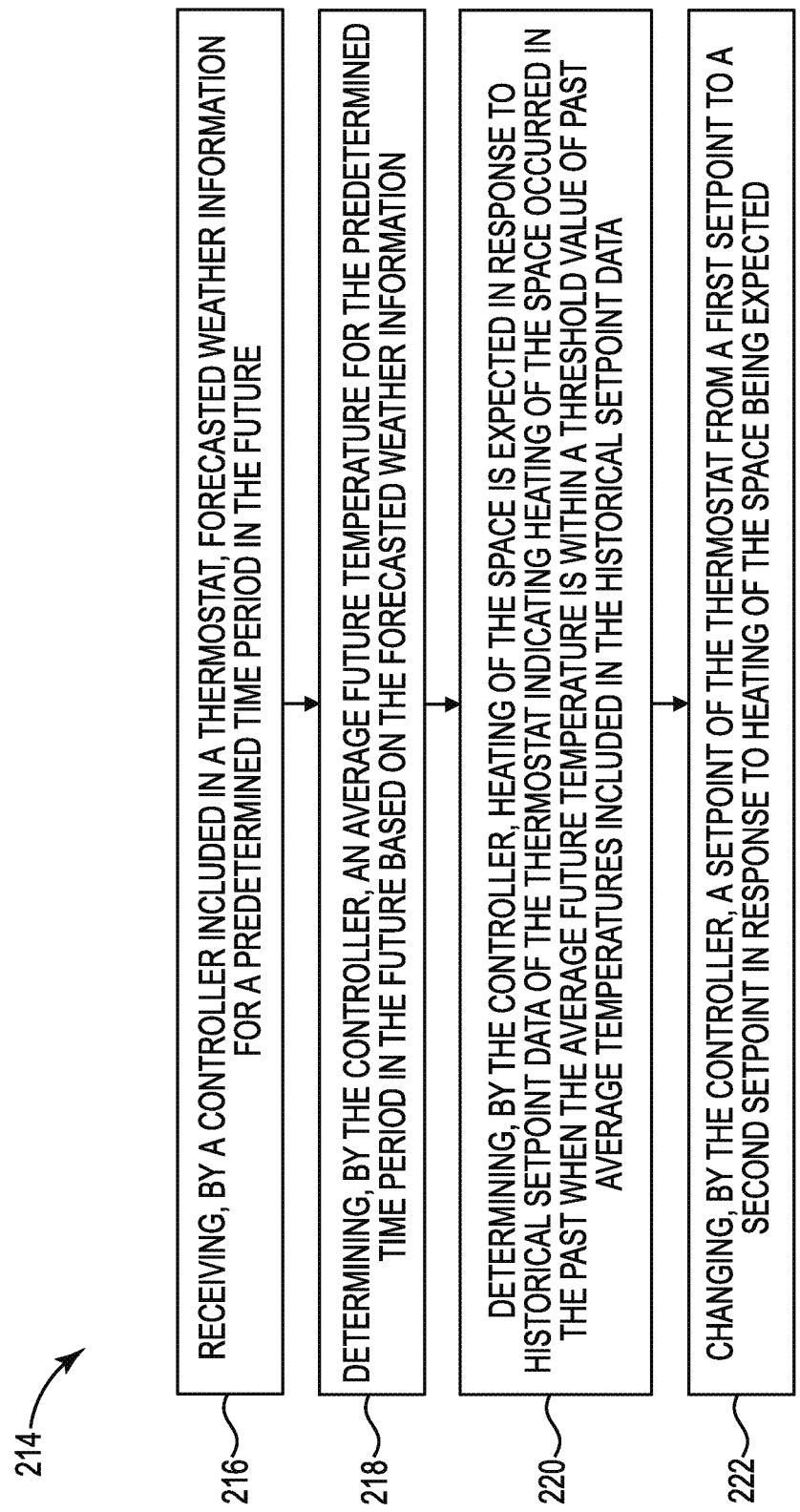

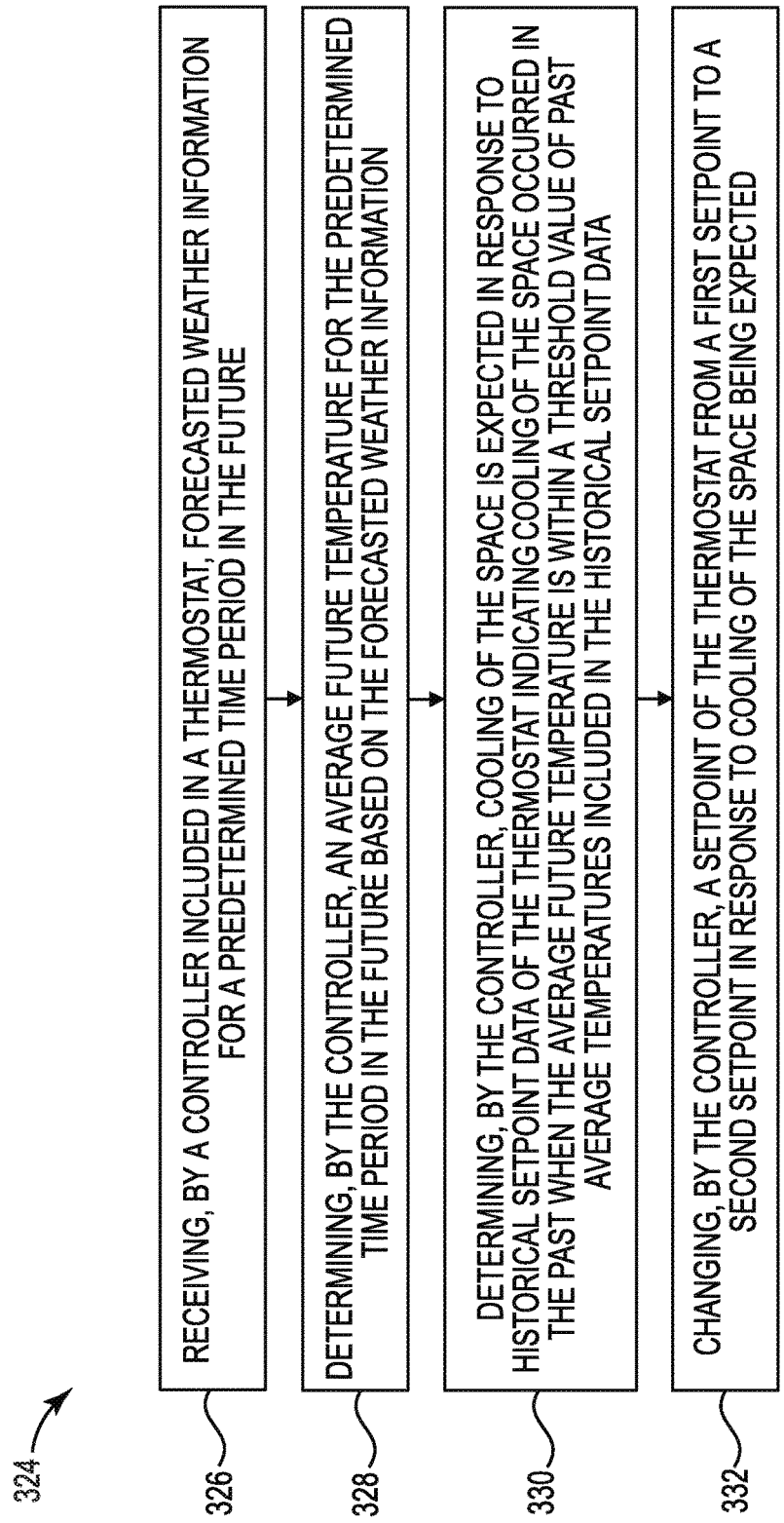

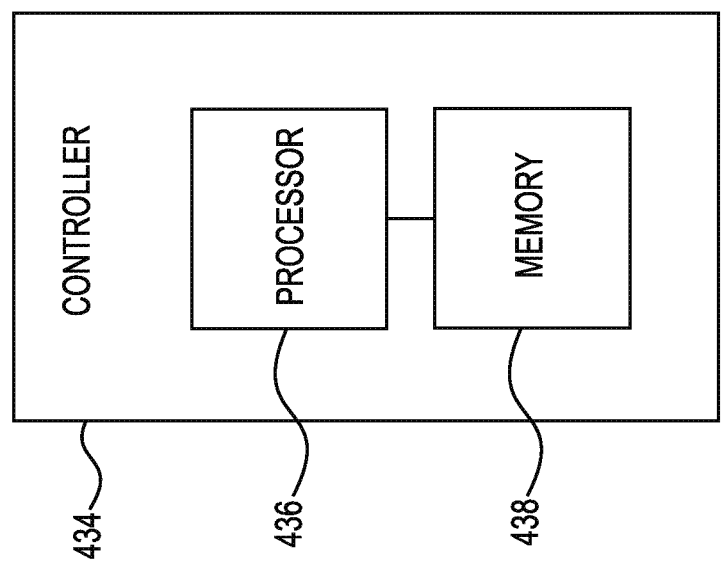

SPACE CONDITIONING BASED ON WEATHER INFORMATION

PRIORITY INFORMATION

This application is a Continuation of U.S. application Ser. No. 15/903,692, filed Feb. 23, 2018, the contents of which are incorporated herein by reference.

TECHNICAL FIELD

The present disclosure relates to methods, devices, and systems for space conditioning based on weather information

BACKGROUND

Various devices may be utilized to control and/or manage a space of a building (e.g., a house, an office building, etc.) In some examples, a thermostat can be utilized to monitor temperature within the building and control other devices such as a heating, ventilation, and air conditioning (HVAC) system. For example, a thermostat can monitor the temperature of a space of the building and change a temperature setpoint of the space of the building if the space should be conditioned.

Conditioning of a space can be based on outdoor weather conditions. In some examples, the space may be heated when an indoor air temperature is lower than a setpoint temperature of the space. In some examples, the space may be cooled when the indoor air temperature is higher than a setpoint temperature of the space.

BRIEF DESCRIPTION OF THE DRAWINGS

FIG. 2 is a flow chart of a method for space heating based on weather information, in accordance with embodiments of the present disclosure.

FIG. 3 is a flow chart of a method for space cooling based on weather information, in accordance with embodiments of the present disclosure.

FIG. 4 is a controller for space conditioning based on weather information, in accordance with embodiments of the present disclosure.

DETAILED DESCRIPTION

Figure 1:
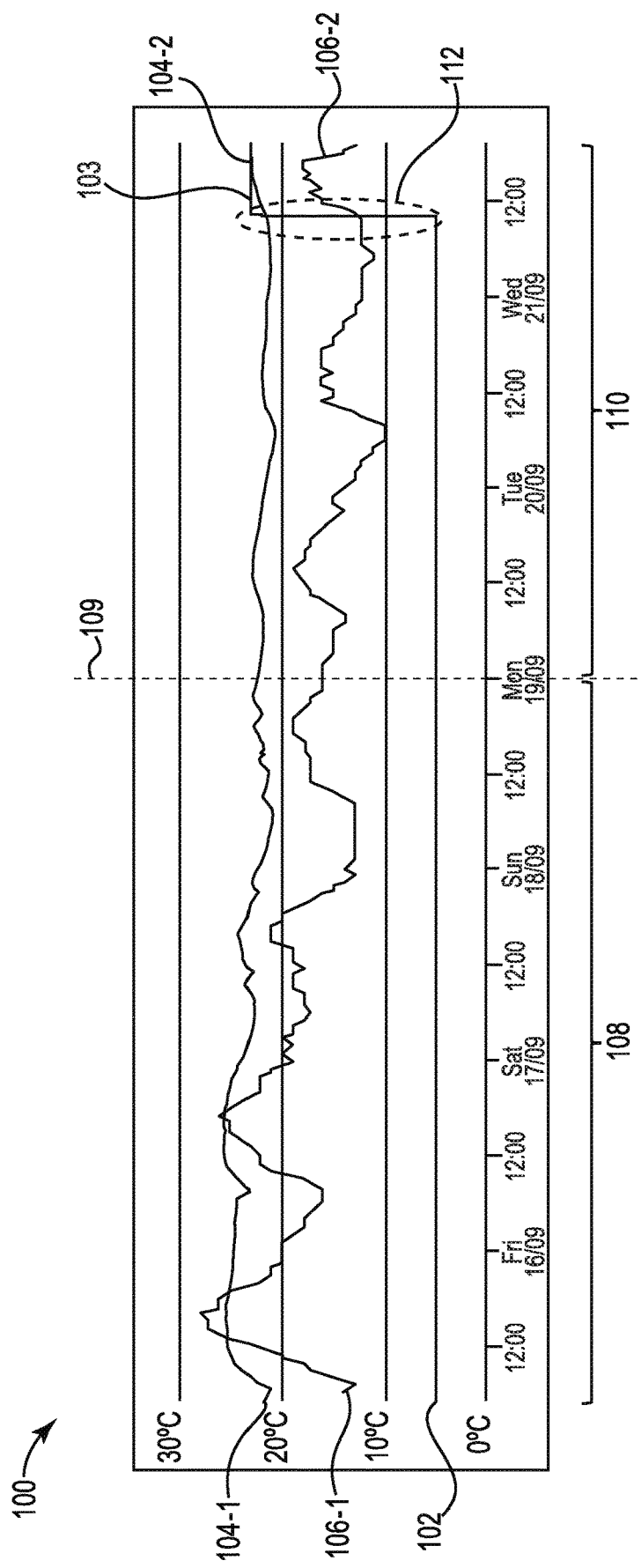
FIG. 1 is an illustration of a temperature trend of an outdoor air temperature and a space temperature, as well as a temperature setpoint of the space in a graphical view, generated in accordance with embodiments of the present disclosure.

Methods, devices, and systems for space conditioning based on weather information are described herein. One device includes a memory, and a processor to execute executable instructions stored in the memory to receive forecasted weather information, determine, based on the forecasted weather information, future weather conditions, determine based on the future weather conditions and historical setpoint data, whether conditioning of a space is expected, and generate an alert in response to conditioning of the space being expected.

An HVAC system controlled by a thermostat may not be able to perform certain space conditioning tasks when the space should be conditioned. For example, an HVAC system may not be able to provide heating to a space as a result of a boiler of the HVAC system being shut off due to seasonal weather conditions (e.g., the boiler is not needed to heat the building during periods of high temperature, such as in the summer). For example, shutting off a boiler can save electricity as compared to an example in which the boiler is turned on, but not heating. However, in an event in which conditioning of the space is needed because the outdoor air temperature drops, the HVAC system may not be able to provide heating to the space. This may result in occupants of the space being uncomfortable, as the temperature of the space is low.

Space conditioning based on weather information, in accordance with the present disclosure, can allow for determination of when conditioning of a space may be needed based on forecasted weather information. For example, forecasted weather information can be utilized to determine when a future temperature setpoint of, for example, a thermostat may be changed. In some examples, this information can allow a user to turn on various HVAC equipment to allow for the space to be conditioned. The HVAC equipment being turned on can allow for the HVAC equipment to provide conditioning to the space in the event it is needed (e.g., a temperature setpoint is changed).

In the following detailed description, reference is made to the accompanying drawings that form a part hereof. The drawings show by way of illustration how embodiments of the disclosure may be practiced.

These embodiments are described in sufficient detail to enable those of ordinary skill in the art to practice embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing.

FIG. 1 is an illustration of a temperature trend of an outdoor air temperature 106 and a space temperature 104, as well as a first setpoint 102 and second setpoint 103 of the space in a graphical view 100, generated in accordance with embodiments of the present disclosure. As illustrated in FIG. 1, the graphical view 100 can include past conditions 108, current conditions 109, future conditions 110, first setpoint 102, second setpoint 103, past space temperature 104-1, future space temperature 104-2 (referred to collectively herein as space temperature 104), past outdoor air temperature 106-1, future outdoor air temperature 106-2 (referred to collectively herein as outdoor air temperature 106), and setpoint change 112.

Space conditioning based on weather information can, for example, be accomplished by a controller (e.g., controller 434, as described in connection with FIG. 4). For example, the controller can receive forecasted weather information, determine future weather conditions based on the forecasted weather information, and determine whether conditioning of a space is expected based on the future weather conditions and historical setpoint data, among other functions, as is further described herein.

The controller can receive forecasted weather information. As used herein, the term "forecasted weather information" can, for example, refer to information regarding a state (and/or a predicted state) of Earth's atmosphere. For example, forecasted weather information can describe a degree to which it is hot or cold, wet or dry, calm or stormy, clear or cloudy, as well as a prediction thereof, among other types of forecasted weather information. Weather information can include temperature, relative humidity, wind conditions, atmospheric pressure, among other types of weather information.

In some examples, the controller can receive the forecasted weather information from a mobile device of a user. As used herein, the term "mobile device" can, for example, refer to devices that are (or can be) carried and/or worn by the user. For example, a mobile device can include a phone (e.g., a smart phone), a tablet, a personal digital assistant (PDA), smart glasses, and/or a wrist-worn device (e.g., a smart watch), among other types of mobile devices. In some examples, a user may search for and transmit forecasted weather information to the controller. In some examples, the mobile device may transmit forecasted weather information to the controller automatically, and/or at various predetermined intervals.

In some examples, the controller can receive the forecasted weather information from an external computing device. As used herein, the term "computing device" can, for example, refer to a laptop computer, a desktop computer, a server, or a mobile device (e.g., a smart phone, tablet, personal digital assistant, smart glasses, a wrist-worn device, etc.), among other types of computing devices. For example, the controller may receive forecasted weather information from a server of a weather service, among other examples.

The controller can determine future weather conditions based on the forecasted weather information. For example, future weather conditions can include a future outdoor air temperature. As illustrated in FIG. 1, future conditions 110 can include future outdoor air temperature 106-2. The controller can determine the future outdoor air temperature 106-2 based on the forecasted weather information.

Although future weather conditions are described above as including a future outdoor air temperature, embodiments of the present disclosure are not so limited. For example, future weather conditions can include a future relative humidity, future wind conditions, future atmospheric pressure, etc.

Future weather conditions can include an average future weather condition. For example, the controller can utilize the future outdoor air temperature 106-2 to determine an average future outdoor air temperature. The average future outdoor air temperature can be for a predetermined time period. For example, the controller can determine an average future outdoor air temperature for a twenty-four-hour time period.

For example, the controller can receive forecasted weather information to determine an average future outdoor air temperature. The average future outdoor air temperature can be for the twenty-four-hour-time period. For instance, as illustrated in FIG. 1, the controller can determine the future outdoor air temperature 106-2 for September $19^{th}$, and based on the future outdoor air temperature 106-2 for September $19^{th}$, determine that the average future outdoor air temperature may be 15 degrees Celsius (° C.) for September $19^{th}$.

Although the average future outdoor air temperature is described above as being for a twenty-four-hour time period, embodiments of the present disclosure are not so limited. For example, the time period may be a twelve-hour time period, a six-hour time period, or any other time period. In such examples, the controller can determine an average future outdoor air temperature for the twelve-hour time period, the six-hour time period, etc.

The controller can determine the future weather conditions for an amount of predetermined time periods in the future. For example, the controller can determine an average future outdoor air temperature for three twenty-four-hour periods. For instance, as illustrated in FIG. 1, the controller can determine an average future outdoor air temperature for September $19^{th}$, September $20^{th}$, and September $21^{st}$. Although not illustrated in FIG. 1 for clarity and so as not to obscure embodiments of the present disclosure, the controller can determine the average future outdoor air temperature for September $19^{th}$ to be 15° C., the average future outdoor air temperature for September $20^{th}$ to be 13° C., and the average future outdoor air temperature for September $21^{st}$ to be 12° C.

Although the amount of predetermined time periods in the future is described as three twenty-four-hour periods, embodiments of the present disclosure are not so limited. For example, the amount of predetermined time periods in the future can be more or less than three twenty-four-hour periods. Moreover, the predetermined time periods can be more or less than twenty-four-hours (e.g., twelve hours, six hours, etc.) and the amount of predetermined time periods can be a combination thereof (e.g., six twelve-hour periods, ten six-hour periods, etc.)

The controller can determine, based on the future weather conditions and historical setpoint data, whether conditioning of a space is expected. As used herein, the term "conditioning" can, for example, include heating, cooling, humidifying, and/or de-humidifying a space, among other examples of conditioning a space. The controller can determine whether conditioning of the space is expected by comparing the future weather conditions and the historical setpoint data, as is further described herein.

Historical setpoint data can include historical space conditioning data and/or past average temperatures. Historical space conditioning data can include data indicating whether conditioning of the space was done. For example, historical space conditioning data can include runtime of a thermostat or other HVAC equipment (e.g., if the runtime is greater than zero, the space conditioning data can indicate the space was conditioned, whether a flame of a boiler was on, etc.), among other space conditioning data. Historical space conditioning data can include past setpoint conditions. For example, past setpoint conditions can include a temperature setpoint, humidity setpoint, etc., as well as a date corresponding to the setpoints. For instance, past setpoint conditions can include a temperature setpoint of 5° C. on September $16^{th}$, indicating heating for the space is turned off.

Historical setpoint data can be stored locally at the controller. For example, the historical setpoint data can be stored in memory (e.g., memory 438, as described in connection with FIG. 4) of the controller. However, embodiments of the present disclosure are not so limited. For example, historical setpoint data can be stored remotely from the controller. That is, historical setpoint data can be stored on an external server, and the controller can receive the historical setpoint data from the external server via a network relationship. For example, the controller can receive the historical setpoint data from the external server via a wired or wireless network.

The wired or wireless network can be a network relationship that connects the external computing device to the controller. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, and/or the Internet, among other types of network relationships.

The controller can determine whether conditioning of the space is expected by comparing the future weather conditions and the historical setpoint data. For example, the controller can compare future weather conditions, such as an average future outdoor air temperature, with historical setpoint data such as past average temperatures, as well as historical space conditioning data indicating whether conditioning of the space was done in the past based on the past average temperatures. The controller can determine whether conditioning of the space is expected based on the comparison, as is further described herein.

In some examples, the controller can determine conditioning of the space is expected in response to the historical setpoint data indicating conditioning of the space occurred in the past when the past average temperatures were the same as the average future temperature. For example, the controller can determine that the historical setpoint data indicates that, in the past, the average outdoor air temperature was 12° C. and that conditioning of the space occurred as a result of the average outdoor air temperature being 12° C. The controller can compare the historical setpoint data (e.g., average outdoor air temperature of 12° C., resulting in conditioning of the space) with the average future outdoor air temperature of Sep. 21, 2017 (e.g., average outdoor air temperature of 12° C.) to determine that conditioning of the space is to be expected on Sep. 21, 2017.

In some examples, the controller can determine conditioning of the space is expected in response to the historical setpoint data indicating conditioning of the space occurred in the past when the average future temperature is within a threshold range of the past average temperatures included in the historical setpoint data. For example, the controller can determine that the historical setpoint data indicates that, in the past, the average outdoor air temperature was 11° C. and that conditioning of the space occurred in the past as a result of the average outdoor air temperature being 11° C. The controller can compare the historical setpoint data (e.g., average outdoor air temperature of 11° C., resulting in conditioning of the space) with the average future outdoor air temperature of Sep. 21, 2017 (e.g., average future outdoor air temperature of 12° C.), where the threshold range is ±2° C. Based on the average future outdoor air temperature of 12° C. being within the threshold range (e.g., ±2° C.), the controller can determine that conditioning of the space is to be expected on Sep. 21, 2017.

Although the controller can determine conditioning of the space is to be expected based on the average future outdoor air temperature of a particular day being within a threshold range of the temperature of a corresponding particular day in the past, embodiments of the present disclosure are not so limited. For example, the controller can utilize other days in prior years with outdoor air temperatures that include the threshold range of the particular day. For instance, the average future outdoor air temperature of Sep. 21, 2017 may be 12° C., and the controller can utilize other days in 2017 and/or in years prior (e.g., 2016, 2015, etc.) in which historical setpoint data indicated outdoor air temperatures between 10° C. and 14° C., and whether conditioning of the space occurred on those days. That is, if conditioning of the space occurred on those days in which historical setpoint data indicated outdoor air temperatures between 10° C. and 14° C., the controller can determine that conditioning of the space is to be expected for the particular day (e.g., Sep. 21 of 2017).

Although the threshold range is described above as ±2° C., embodiments of the present disclosure are not so limited. For example, the threshold range can be greater than ±2° C. (e.g., ±3° C.), less than ±2° C. (e.g., ±1° C.), or any other range. In some examples, a larger threshold range can result in a higher probability that historical setpoint data ca be found that is within a threshold range of the average future outdoor air temperature. However, a larger range may result in a loss of precision as to the estimation of whether conditioning of the space is to be expected for a particular future day.

In some examples, the controller can determine conditioning of the space is expected in response to a probability of the historical setpoint data indicating conditioning of the space occurred in the past exceeding a threshold probability value. Continuing with the example from above, the average future outdoor air temperature of Sep. 21, 2017 is forecasted to be 12° C. The controller can determine that the historical setpoint data indicates that for 100 days with similar temperatures (e.g., 12° C.) in the past (e.g., days that have the same temperature and/or days that have a temperature within a threshold temperature of the average future outdoor air temperature), conditioning of the space occurred in 90 of those past days. The controller can determine that there is a 90% probability that conditioning of the space is expected for Sep. 21, 2017.

The 100 days in the past can include days in 2016, 2015, 2014, and/or years prior to 2014, and/or any combination thereof that have the same temperature and/or days that have a temperature within a threshold temperature of the average future outdoor air temperature.

The controller can compare the determined 90% probability to a threshold probability amount. For instance, the threshold probability as to whether conditioning of the space is to be expected may be 85%. Based on the 90% probability exceeding the threshold 85% probability, the controller can determine that conditioning of the space is expected for Sep. 21, 2017, based on the average future outdoor air temperature forecasted for Sep. 21, 2017.

Although the controller is described above as determining a 90% probability based on historical setpoint data including 100 days with similar temperatures, embodiments of the disclosure are not so limited. For example, the controller can determine that for 50 days, conditioning of the space occurred in 45 days with similar temperatures in the past (e.g., 90% probability of conditioning, which exceeds an 85% threshold probability). In other words, if the probability of conditioning occurring in a set amount of days exceeds a threshold probability, the controller can determine that conditioning of a s pace is expected for a particular day based on an average future outdoor air temperature forecasted for the particular day.

The controller can generate an alert in response to conditioning of the space being expected. The alert can be an audible tone, and/or a notification, among other types of alerts, as is further described herein.

The controller can generate an audible tone in response to conditioning of the space being expected. For example, the controller can be part of a thermostat. The controller can cause the audible tone can be generated via a speaker included in the thermostat.

The controller can generate a notification in response to conditioning of the space being expected. The controller can generate and transmit the notification to a mobile device of a user. In some examples, the thermostat may be a residential thermostat, and the controller can generate and transmit the notification to a mobile device of an owner or head of household of the residential thermostat, or in some examples transmit the notification to a mobile device of a contractor or HVAC technician. In some examples, the thermostat may be a thermostat included in a commercial building, and the controller can generate and transmit the notification to a mobile device of building manager, service technician, and/or other user. In either example, the controller can transmit the notification to the mobile device via a network relationship.

The controller can change a setpoint of the thermostat in response to conditioning of the space being expected. For example, the controller can change the setpoint of the thermostat from a first setpoint 102 to a second setpoint 103 in response to conditioning of the space being expected. In examples in which heating is to be expected, the second setpoint 103 can be higher than the first setpoint 102. For example, as illustrated in FIG. 1, setpoint change 112 indicates the second setpoint 103 as being higher (e.g., 22° C.) than the first setpoint 102 (e.g., 5° C.), indicating heating is to be expected on September $21^{st}$. In examples in which cooling is to be expected, the second setpoint 103 can be lower than the first setpoint 102.

The controller can generate an alarm when a change in temperature of the space is not detected by a thermostat within a threshold period of time and the controller has changed the setpoint from the first setpoint 102 to the second setpoint 103. For example, the controller may cause the thermostat to change the setpoint from the first setpoint 102 (e.g., 5° C.) to the second setpoint 103 (e.g., 22° C.). If a change in temperature is not detected by the thermostat after a threshold amount of time (e.g., fifteen minutes), the controller can generate an alarm. The alarm can be an audible alarm generated by a speaker included in the thermostat, and/or the alarm can be a notification sent to a mobile device of a user. The alarm can indicate a piece of HVAC equipment may not be functioning properly, as a temperature change in the space is expected but has not occurred.

In some examples, the change in temperature may be a threshold temperature change in a threshold amount of time. For example, the threshold temperature change may be 2° C. within fifteen minutes. In such an example, the controller can generate an alarm if a threshold temperature change of 2° C. is not detected within fifteen minutes, although embodiments of the present disclosure are not limited to a threshold temperature change of 2° C. (e.g., the threshold temperature change could be more or less than 2° C.) and a threshold amount of time of fifteen minutes (e.g., the threshold amount of time may be more or less than fifteen minutes).

The controller can generate an alarm when a response signal from an HVAC system is not received by the controller and the controller has changed the setpoint from the first setpoint 102 to the second setpoint 103. For example, the controller may cause the thermostat to change the setpoint from the first setpoint 102 (e.g., 5° C.) to the second setpoint 103 (e.g., 22° C.). If a response signal from the HVAC system is not received by the controller in response to the signal sent by the controller to the HVAC system to condition the space, the controller can generate an alarm. As described above, the alarm can be an audible alarm generated by a speaker included in the thermostat, and/or the alarm can be a notification sent to a mobile device of a user, and can indicate a piece of HVAC equipment may not be functioning properly, as a response signal from the HVAC equipment is expected but has not been received based on the temperature setpoint change.

Although the examples above describe space conditioning by changing temperatures of the space based on outdoor air temperature, embodiments of the present disclosure are not so limited. For example, other space conditioning (e.g., space humidification and/or de-humidification), can occur based on other outdoor weather conditions, such as relative humidity, wind conditions, atmospheric pressure, etc., as well as any combinations thereof.

Space conditioning based on weather information, according to the present disclosure, can allow for determination of when conditioning of a space may be needed based on forecasted weather information. Based on this information, a user may be able to proactively turn on and/or off various HVAC equipment based on the conditioning of the space (e.g., heating, cooling, humidifying, de-humidifying, etc.) Additionally, a user may be able to determine that, based on conditioning not being necessary for a future number of days, maintenance for HVAC equipment may be scheduled if necessary. In some examples, a contractor or other maintenance personnel may be able to proactively schedule maintenance for HVAC equipment based on conditioning not being necessary for a future number of days.

FIG. 2 is a flow chart of a method 214 for space heating based on weather information, in accordance with embodiments of the present disclosure. Method 214 may be performed by, for example, a controller (e.g., controller 434, as described in connection with FIG. 4).

At 216, the method 214 can include receiving, by a controller included in a thermostat, forecasted weather information for a predetermined time period in the future. For example, the forecasted weather information can include a forecasted outdoor air temperature for a twenty-four-hour period.

At 218, the method 214 can include determining, by the controller, an average future temperature for the predetermined time period in the future based on the forecasted weather information. For example, based on the forecasted outdoor air temperature for the twenty-four-hour time period, the controller can determine the average future outdoor air temperature for the twenty-four-hour time period. For instance, the controller can determine the average future outdoor air temperature for the twenty-four-hour time period to be 12° C.

At 220, the method 214 can include determining, by the controller, heating of the space is expected in response to the historical setpoint data indicating heating of the space occurred in the past when the average future temperature is within a threshold range of the past average temperatures included in the historical setpoint data. For example, the controller can determine that the historical setpoint data indicates that, in the past, the average outdoor air temperature was 11° C. and that heating of the space occurred at that time in the past as a result of the average outdoor air temperature being 11° C. Based on an average future outdoor air temperature of 12° C. for Sep. 21, 2017 being within a threshold range (e.g., ±2° C.) of the past average temperatures included in the historical setpoint data, the controller can determine that heating of the space is to be expected on Sep. 21, 2017.

In some examples, the method 214 can include determining, by the controller, heating of the space is expected in response to the historical setpoint data indicating heating of the space occurred in the past when the past average outdoor air temperatures were the same as the average future outdoor air temperature. For example, the controller can determine that the historical setpoint data indicates that, in the past, the average outdoor air temperature was 12° C. and that heating of the space occurred at that time in the past as a result of the average outdoor air temperature being 12° C. Based on the average future outdoor air temperature for Sep. 21, 2017 (e.g., 12° C.), the controller can determine that heating of the space is to be expected on Sep. 21, 2017.

In some examples, the method 214 can include determining, by the controller, heating of the space is expected in response to a probability of the historical setpoint data indicating heating of the space occurred in the past exceeding a threshold probability value. For example, the average future outdoor air temperature of Sep. 21, 2017 can be forecasted to be 12° C. The controller can determine that the historical setpoint data indicates that for 100 days with similar temperatures (e.g., 12° C.) in the past, heating of the space occurred in 90 of those past days. The controller can determine that there is a 90% probability that heating of the space is expected for Sep. 21, 2017. Based on the determined probability exceeding a threshold probability of 85%, the controller can determine that heating of the space is expected for Sep. 21, 2017.

At 222, the method 214 can include changing, by the controller, a setpoint of the thermostat from a first setpoint to a second setpoint in response to heating of the space being expected. For example, the first setpoint for the space can be 5° C. to prevent heating of the space from occurring. In other words, 5° C. can be used as a general setpoint to prevent heating from occurring (e.g., during non-heating weather conditions). Based on heating of the space being expected, the controller can change the setpoint of the thermostat from the first setpoint to a second setpoint (e.g., 22° C.) to cause an HVAC system of the building to heat the space.

FIG. 3 is a flow chart of a method 324 for space cooling based on weather information, in accordance with embodiments of the present disclosure. Method 324 may be performed by, for example, a controller (e.g., controller 434, as described in connection with FIG. 4).

At 326, the method 324 can include receiving, by a controller included in a thermostat, forecasted weather information for a predetermined time period in the future. For example, the forecasted weather information can include a forecasted outdoor air temperature for a twenty-four-hour period.

At 328, the method 324 can include determining, by the controller, an average future temperature for the predetermined time period in the future based on the forecasted weather information. For example, based on the forecasted outdoor air temperature for the twenty-four-hour time period, the controller can determine the average future outdoor air temperature for the twenty-four-hour time period. For instance, the controller can determine the average future outdoor air temperature for the twenty-four-hour time period to be 30° C.

At 330, the method 324 can include determining, by the controller, cooling of the space is expected in response to the historical setpoint data indicating cooling of the space occurred in the past when the average future temperature is within a threshold range of the past average temperatures included in the historical setpoint data. For example, the controller can determine that the historical setpoint data indicates that, in the past, the average outdoor air temperature was 29° C. and that cooling of the space occurred at that time in the past as a result of the average outdoor air temperature being 29° C. Based on an average future outdoor air temperature of 30° C. for May 21, 2017 being within a threshold range (e.g., ±2° C.) of the past average temperatures included in the historical setpoint data, the controller can determine that cooling of the space is to be expected on May 21, 2017.

In some examples, the method 324 can include determining, by the controller, cooling of the space is expected in response to the historical setpoint data indicating cooling of the space occurred in the past when the past average outdoor air temperatures were the same as the average future outdoor air temperature. For example, the controller can determine that the historical setpoint data indicates that, in the past, the average outdoor air temperature was 30° C. and that cooling of the space occurred at that time in the past as a result of the average outdoor air temperature being 30° C. Based on the average future outdoor air temperature for May 21, 2017 (e.g., 30° C.), the controller can determine that cooling of the space is to be expected on May 21, 2017.

In some examples, the method 324 can include determining, by the controller, cooling of the space is expected in response to a probability of the historical setpoint data indicating cooling of the space occurred in the past exceeding a threshold probability value. For example, the average future outdoor air temperature of May 21, 2017 can be forecasted to be 30° C. The controller can determine that the historical setpoint data indicates that for 100 days with similar temperatures (e.g., 30° C.) in the past, cooling of the space occurred in 90 of those past days. The controller can determine that there is a 90% probability that cooling of the space is expected for May 21, 2017. Based on the determined probability exceeding a threshold probability of 85%, the controller can determine that cooling of the space is expected for May 21, 2017.

At 332, the method 324 can include changing, by the controller, a setpoint of the thermostat from a first setpoint to a second setpoint in response to heating of the space being expected. For example, the first setpoint for the space can be 35° C. Based on cooling of the space being expected, the controller can change the setpoint of the thermostat from the first setpoint to a second setpoint (e.g., 20° C.) to cause an HVAC system of the building to cool the space.

FIG. 4 is a controller 434 for space conditioning based on weather information, in accordance with embodiments of the present disclosure. As illustrated in FIG. 4, controller 434 can include memory 438 and a processor 436 for space conditioning based on weather information in accordance with the present disclosure.

The memory 438 can be any type of storage medium that can be accessed by the processor 436 to perform various examples of the present disclosure. For example, the memory 438 can be a non-transitory computer readable medium having computer readable instructions (e.g., computer program instructions) stored thereon that are executable by the processor 436 for space conditioning based on weather information in accordance with the present disclosure. The computer readable instructions can be executable by the processor 436 to redundantly generate the space conditioning based on weather information.

The memory 438 can be volatile or nonvolatile memory. The memory 438 can also be removable (e.g., portable) memory, or non-removable (e.g., internal) memory. For example, the memory 438 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 438 is illustrated as being located within controller 434, embodiments of the present disclosure are not so limited. For example, memory 434 can also be located internal to another computing resource (e.g., enabling computer readable instructions to be downloaded over the Internet or another wired or wireless connection).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A controller for determining conditioning of a space, comprising:
   a memory;
   a processor configured to execute executable instructions stored in the memory to:
   receive forecasted weather information;
   determine, based on the forecasted weather information, future weather conditions;
   determine, based on the future weather conditions and historical setpoint data, whether conditioning of a space is expected in response to a probability of the historical setpoint data indicating conditioning of the space occurred in the past; and
   change a setpoint of a thermostat from a first setpoint to a second setpoint in response to conditioning of the space being expected.

2. The controller of claim 1, including instructions to cause the processor to determine conditioning of the space is expected in response to the probability of the historical setpoint data indicating conditioning of the space occurred in the past exceeding a threshold probability value.

3. The controller of claim 1, including instructions to cause the processor to determine, based on the future weather conditions and the historical setpoint data, whether conditioning of the space is expected in response to the historical setpoint data indicating conditioning of the space occurred in the past when the future weather conditions are within a threshold range of past weather conditions included in the historical setpoint data.

4. The controller of claim 1, wherein the future weather conditions include at least one of:
   a future outdoor air temperature;
   a future relative humidity;
   future wind conditions; and
   future atmospheric pressure.

5. The controller of claim 1, including instructions to cause the processor to generate an alert in response to conditioning of the space being expected.

6. The controller of claim 1, including instructions to cause the processor to generate an audible tone in response to conditioning of the space being expected.

7. The controller of claim 1, including instructions to cause the processor to:
   generate a notification in response to conditioning of the space being expected; and
   transmit the notification to a mobile device.

8. The controller of claim 1, wherein the setpoint of the thermostat is a temperature setpoint.

9. The controller of claim 1, wherein the setpoint of the thermostat is a humidity setpoint.

10. A non-transitory computer readable medium having computer readable instructions stored thereon that are executable by a processor to:
    receive forecasted weather information;
    determine, based on the forecasted weather information, an average future temperature for a predetermined time period;
    compare the average future temperature for the predetermined time period with historical setpoint data;
    determine, based on the comparison, whether conditioning of a space is expected in response to a probability of the historical setpoint data indicating conditioning of the space occurred in the past; and
    change a setpoint of a thermostat from a first setpoint to a second setpoint in response to conditioning of the space being expected.

11. The computer readable medium of claim 10, wherein the computer readable instructions are executed by the processor to generate an alarm when:
    a change in temperature of the space is not detected within a threshold period of time; and
    the setpoint has been changed from the first setpoint to the second setpoint.

12. The computer readable medium of claim 10, wherein the historical setpoint data includes:
    past average temperatures; and
    historical space conditioning data correspondingly associated with the past average temperatures.

13. The computer readable medium of claim 12, wherein the computer readable instructions are executed by the processor to determine conditioning of the space is expected in response to the historical setpoint data indicating conditioning of the space occurred in the past when the past average temperatures were the same as the average future temperature.

14. The computer readable medium of claim 10, wherein the historical space conditioning data can include:
    runtime of heating, ventilation, and air conditioning (HVAC) equipment; or
    past setpoint conditions.

15. A method for determining conditioning of a space, comprising:

receiving, by a controller included in a thermostat, forecasted weather information for a predetermined time period in the future;

determining, by the controller, a future temperature for the predetermined time period in the future based on the forecasted weather information;

determining, by the controller, conditioning of the space is expected in response to a probability of historical setpoint data of the thermostat indicating conditioning of the space occurred in the past exceeding a threshold probability value; and changing, by the controller, a setpoint of the thermostat from a first setpoint to a second setpoint in response to conditioning of the space being expected.

16. The method of claim 15, wherein the method includes changing, by the controller, the setpoint of the thermostat from the first setpoint to the second setpoint to heat the space, wherein the first setpoint is lower than the second setpoint.

17. The method of claim 15, wherein the method includes changing, by the controller, the setpoint of the thermostat from the first setpoint to the second setpoint to cool the space, wherein the first setpoint is higher than the second setpoint.

18. The method of claim 15, wherein the method includes determining, by the controller, the future temperature for the predetermined time period by determining an average future temperature for the predetermined time period.

19. The method of claim 15, wherein the method includes generating an alarm in response to a response signal from a heating, ventilation, and air conditioning (HVAC) system not being received by the controller based on the setpoint change.

20. The method of claim 15, wherein the method includes generating an alarm in response to a change in temperature of the space not being detected by the thermostat within a threshold period of time.

* * * * *